Figure 5:
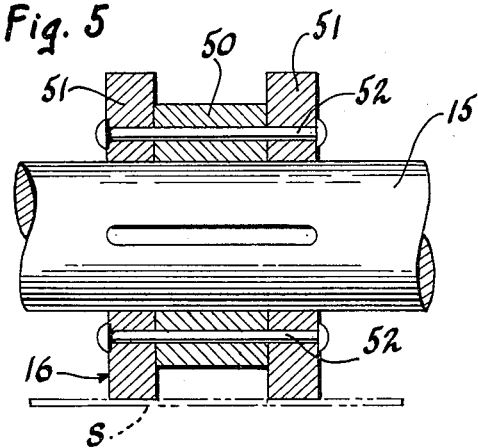

Nov. 15, 1960    R. W. HERR ET AL    2,960,242
MATERIAL HANDLING
Filed Nov. 14, 1956    8 Sheets-Sheet 1
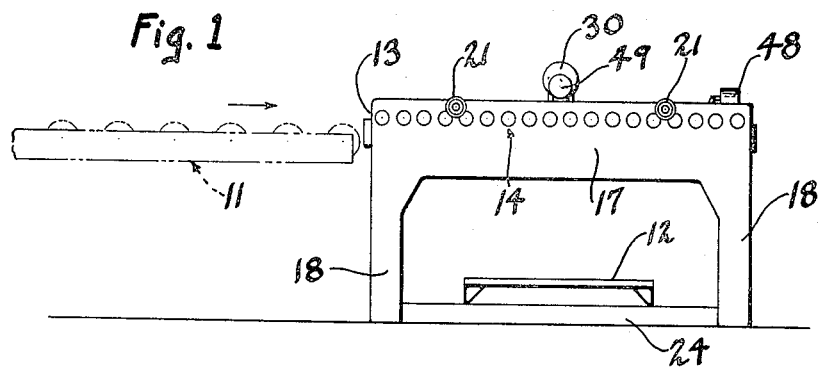
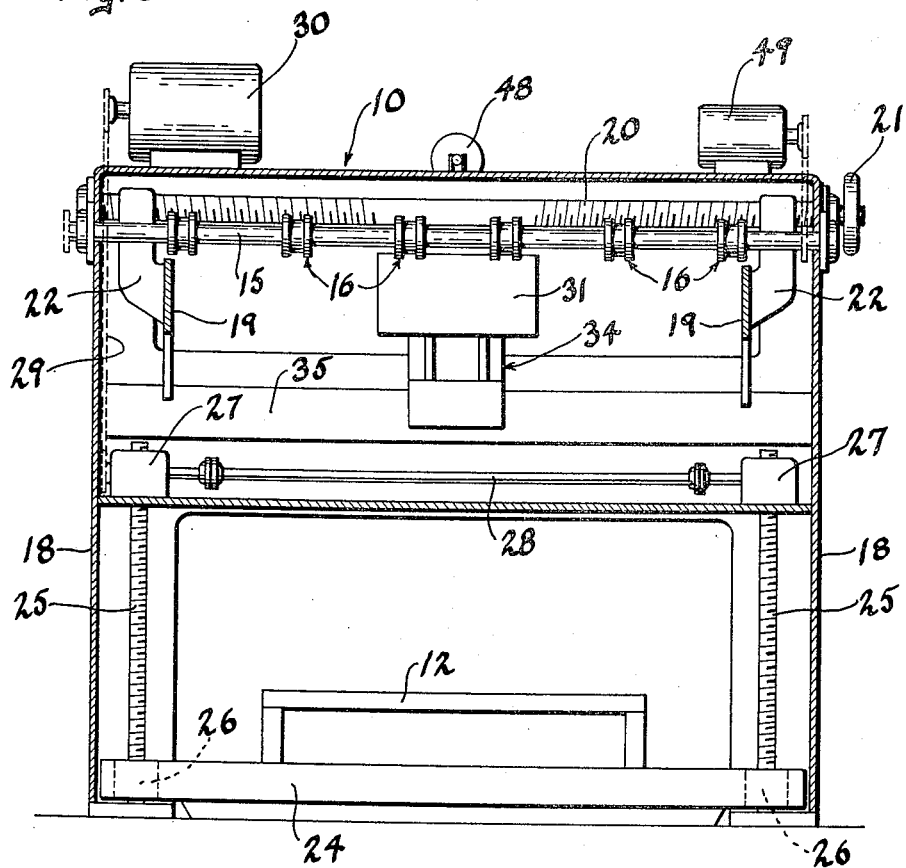
INVENTORS
RICHARD W. HERR
BY ERNEST W. JAEGER
Attorney

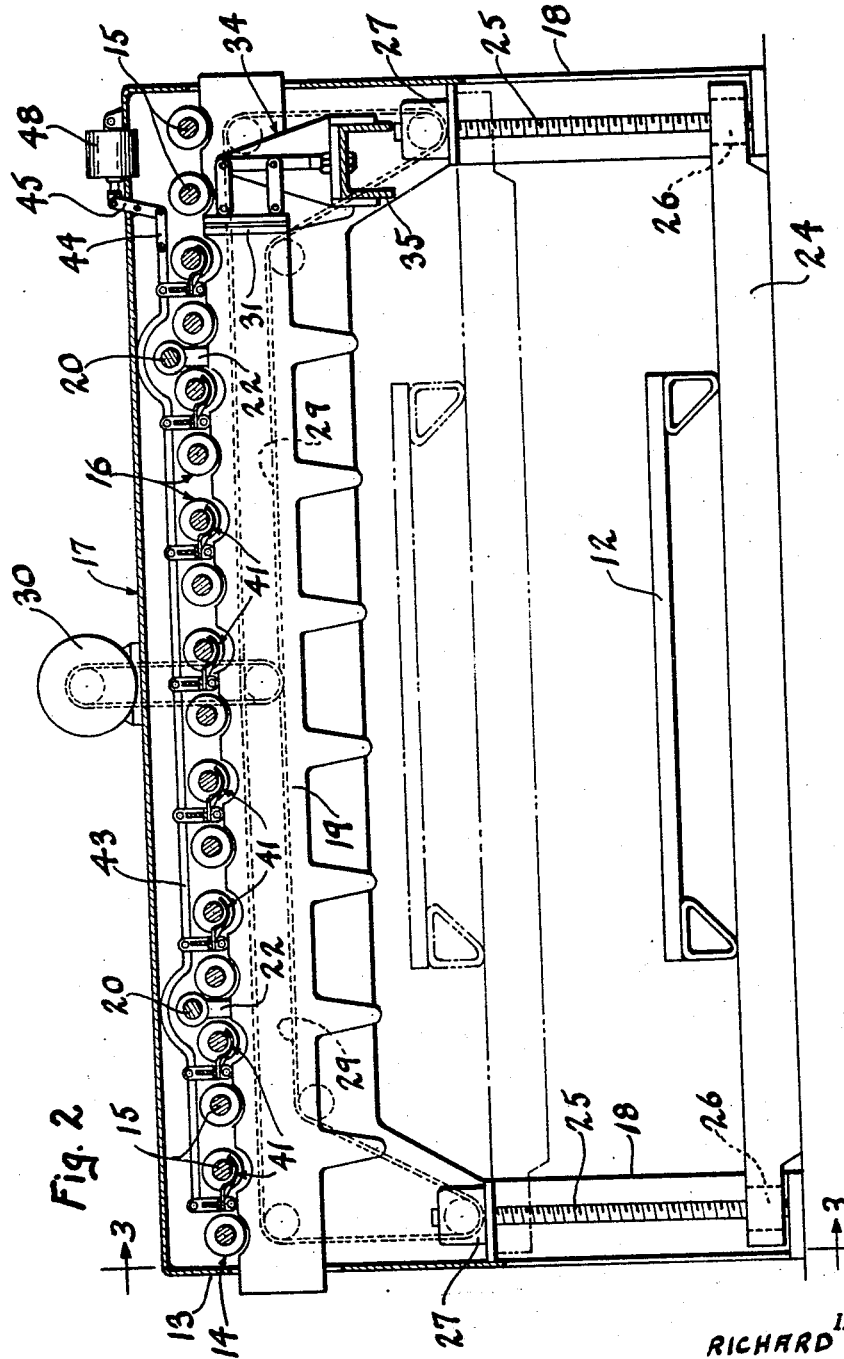

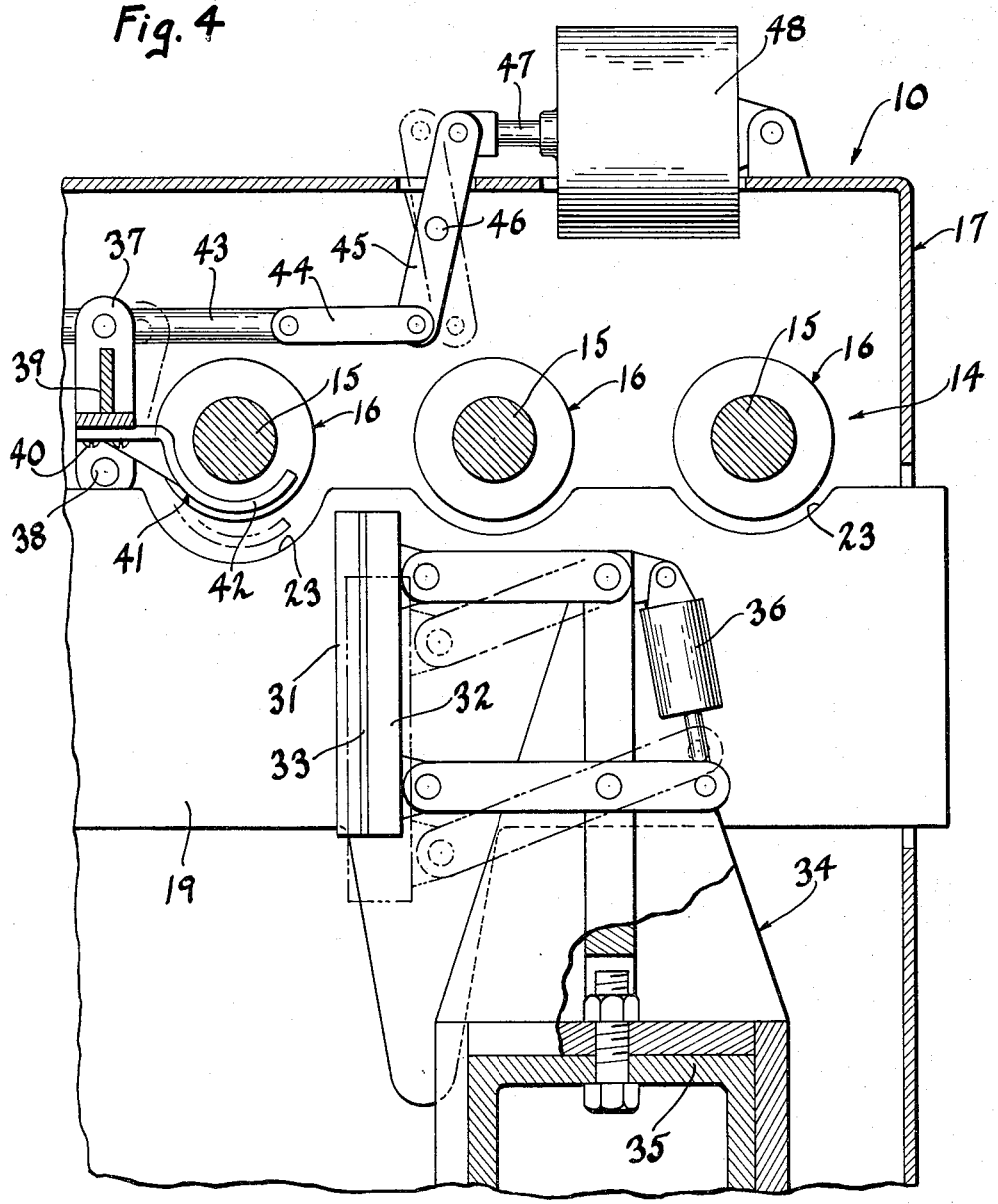

Nov. 15, 1960

R. W. HERR ET AL 2,960,242

MATERIAL HANDLING

Filed Nov. 14, 1956

8 Sheets-Sheet 4

INVENTORS
RICHARD W. HERR
ERNEST W. JAEGER
BY

Attorney

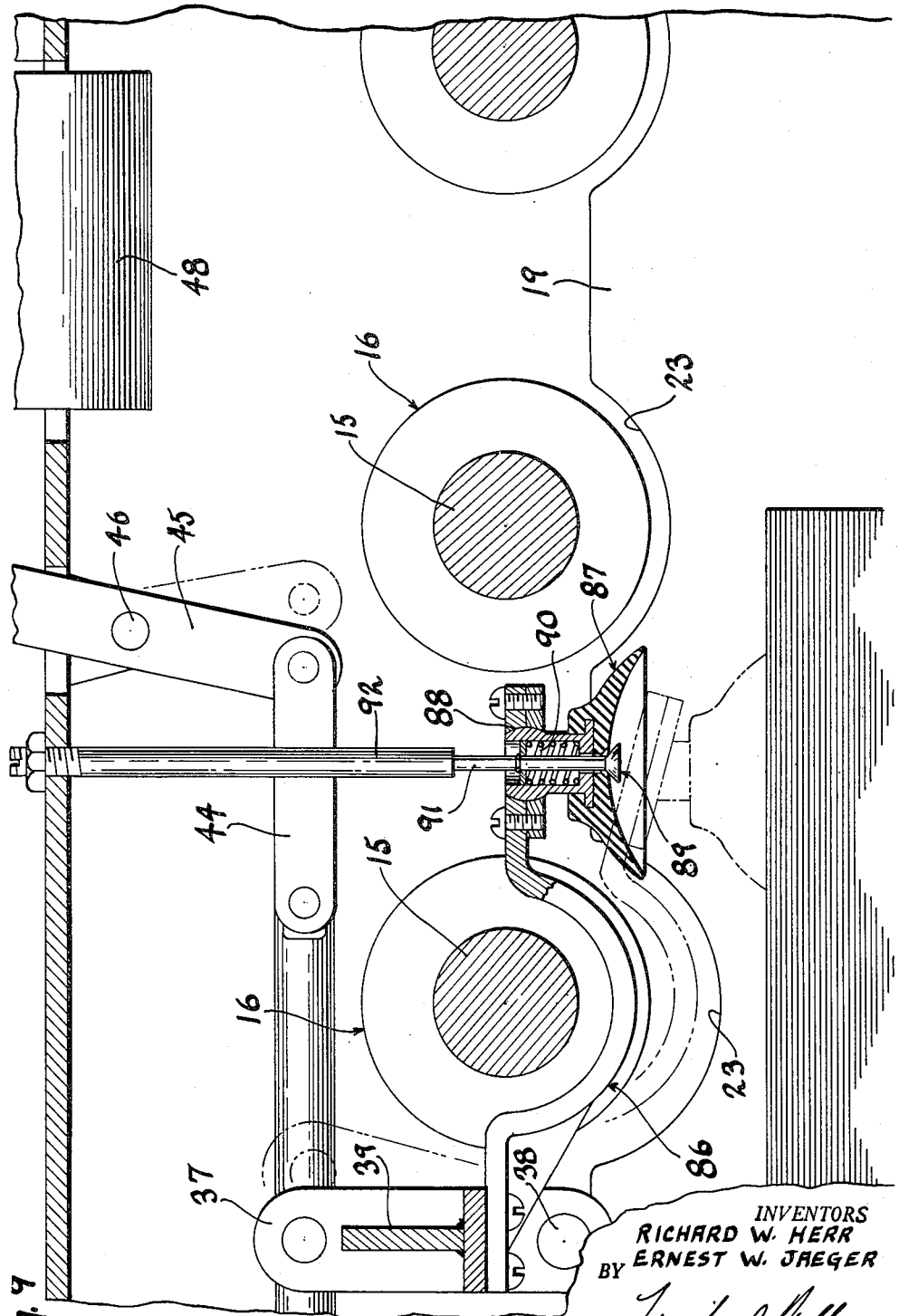

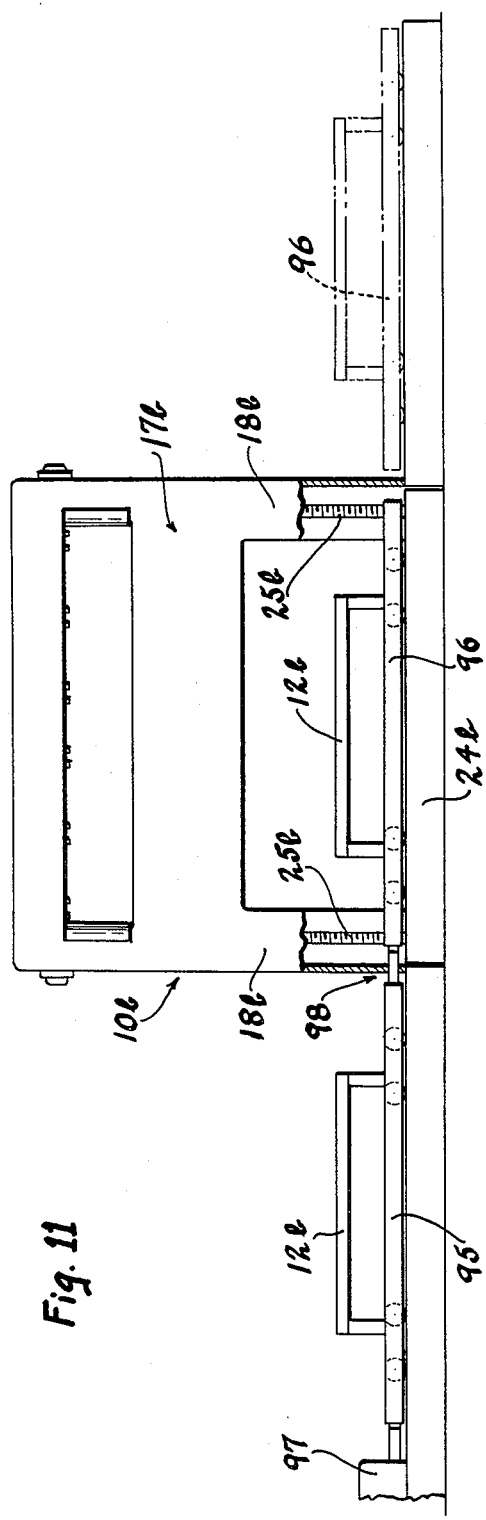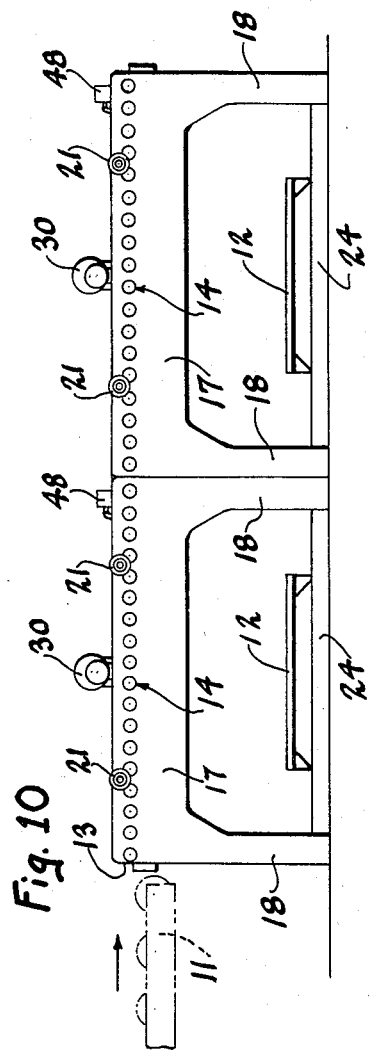

Nov. 15, 1960    R. W. HERR ET AL    2,960,242
MATERIAL HANDLING
Filed Nov. 14, 1956    8 Sheets-Sheet 8
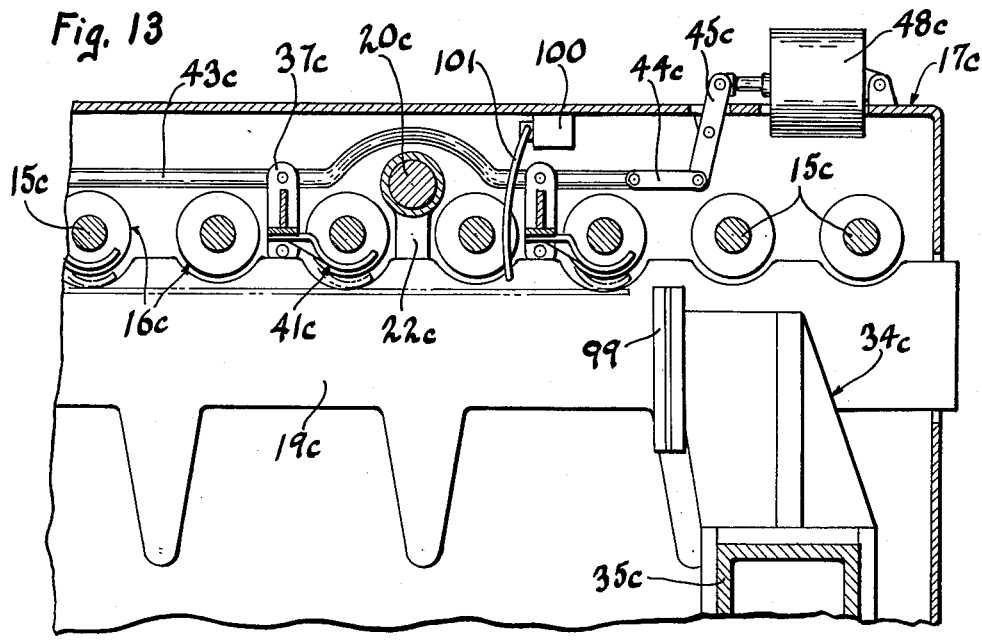
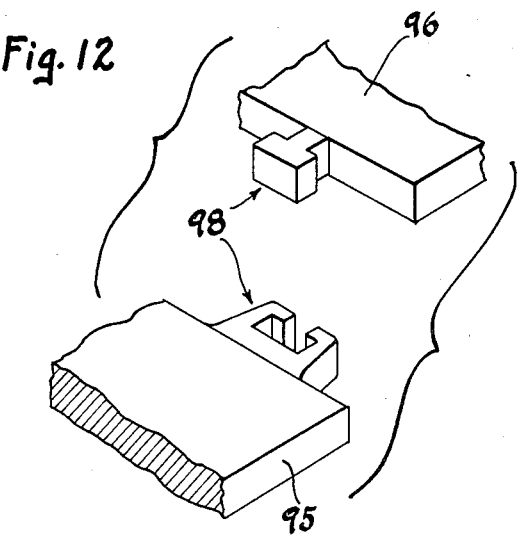
INVENTORS
RICHARD W. HERR
ERNEST W. JAEGER
BY
Attorney United States Patent Office 2,960,242
Patented Nov. 15, 1960

2,960,242

MATERIAL HANDLING

Richard W. Herr, Cortland, and Ernest W. Jaeger, Niles, Ohio, assignors to The Herr Equipment Corporation Filed Nov. 14, 1956, Ser. No. 622,172

2 Claims. (Cl. 214—6)

The present invention relates to material handling, more particularly to methods of and apparatus for handling successive pieces of material, and the principal object of the invention is to provide new and improved methods and apparatus of such character.

The present invention has great utility whenever pieces of material moving in rapid succession are to be stacked one on top of the other or when pieces of material forming such stacks are to be fed from the stack in rapid succession. One of the important advantages of the present invention over the prior art is that it may be used with existing material working or processing equipment without extensive reworking of such equipment or remodeling of the premises where the latter is installed. The apparatus provided by the present invention is sufficiently compact and portable to make it practical to set up the apparatus for use at locations which are temporary.

Another advantage of the invention is that it may be used for either stacking pieces of material fed thereto or for feeding pieces of material from a stack. Furthermore, the invention greatly reduces, and in certain embodiments eliminates entirely, the time lag in operations during which completed stacks of material are removed from the apparatus when it is used for stacking operations or during which stacks of material are moved to the apparatus when it is used for feeding operations. These and other advantages will readily become apparent from a study of the following description and from the drawings appended hereto.

Figure 6:
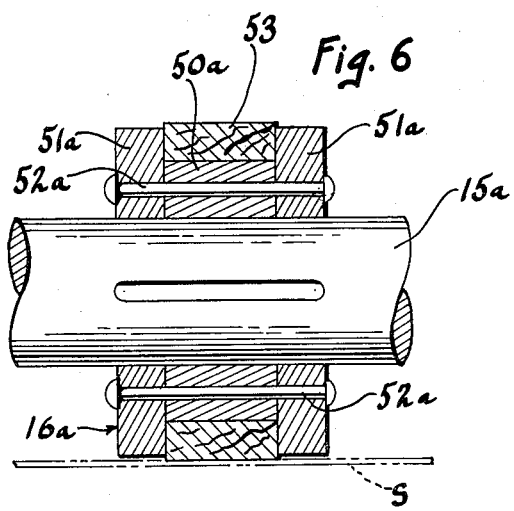
Figure 7:
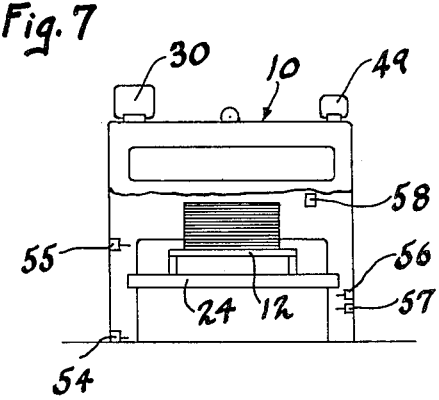
Figure 8:
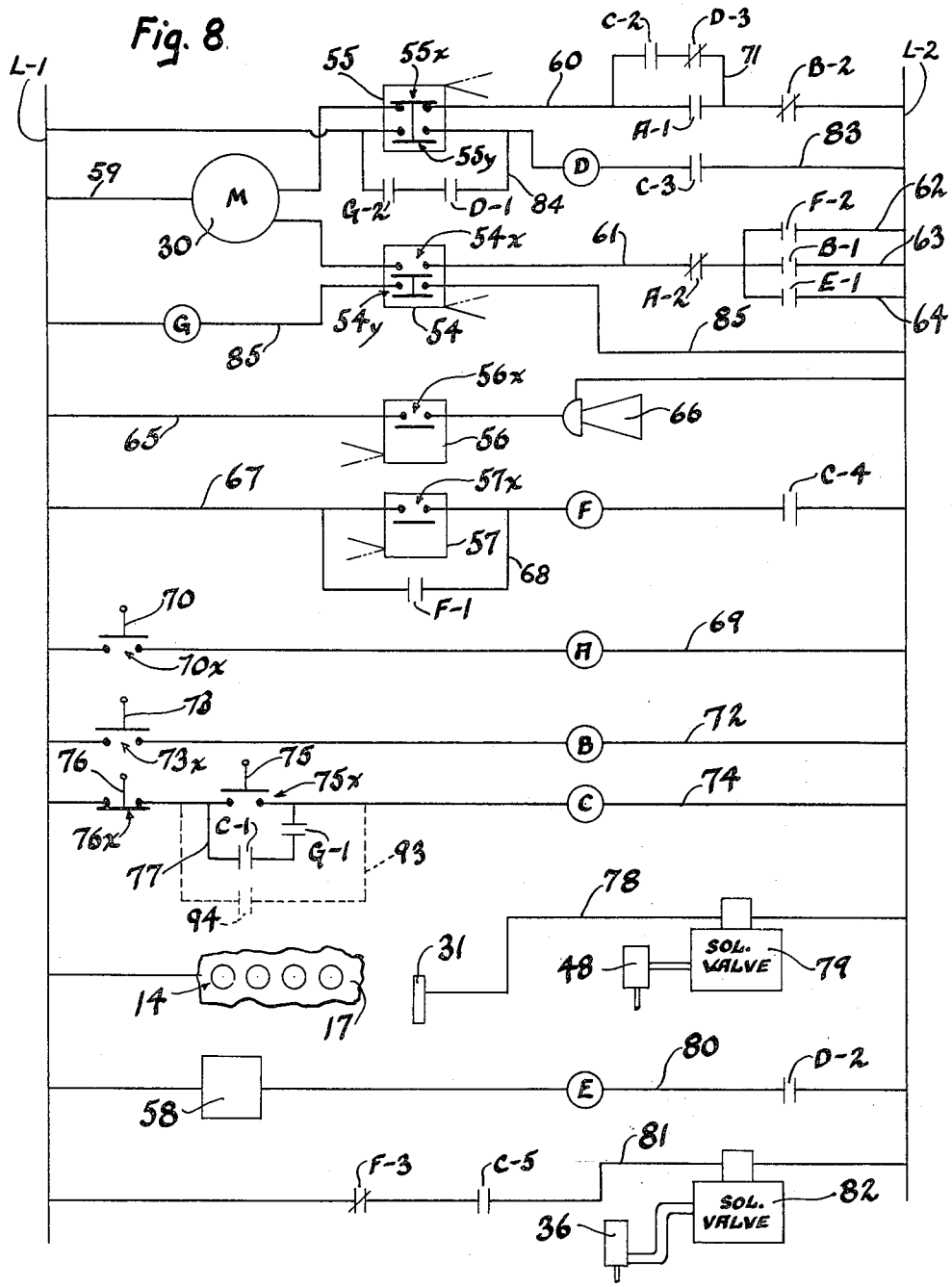

In the drawings accompanying this specification and forming a part of this application there are shown, for purpose of illustration, embodiments which the invention may assume, and in these drawings:

Figure 1 is a side elevational view of a preferred embodiment of the present invention, certain well-known, prior art apparatus with which it may be used being shown by phantom lines, Figure 2 in enlarged view similar to Figure 1 but with the near side of the apparatus removed to illustrate the interior construction, Figure 3 is a sectional view generally corresponding to the line 3—3 of Figure 2, Figure 4 is a view of a portion of the construction shown in Figure 2 but considerably enlarged to better show certain parts which are movable from their full line position to their phantom line position, Figure 5 is a fragmentary enlarged sectional view of a detail, Figure 6 is a view similar to Figure 5 but of a modified construction, Figure 7 is a reduced size, generally diagrammatic end elevational view of the apparatus with a portion of the near side removed to illustrate the relative position of certain control components, Figure 8 is a schematic diagram showing electrical circuits employed to carry out operation of the invention, Figure 9 is a view similar to Figure 4 but still further enlarged and illustrating certain parts (broken away to show the interior construction) which replace certain parts shown in Figure 4 so as to adapt the apparatus for a different function, Figure 10 is a view similar to Figure 1 but showing two pieces of apparatus of the present invention arranged in tandem to carry out a novel method of operation, Figure 11 is a reduced size, side elevational view of another embodiment of the invention, Figure 12 is an enlarged, fragmentary, exploded perspective view of a detail employed in the embodiment shown in Figure 11, and Figure 13 is a view similar to Figure 4, but shown to a reduced scale, of another embodiment of the invention.

In the embodiment shown in Figures 1, 2, 3 and 4, there is illustrated apparatus 10 which is adapted to receive successive pieces of material moving along in the direction of the arrow and discharged by any conventional device such as, for example, a conveyor 11 and to pile such pieces on a skid 12 or other suitable support.

Briefly, apparatus 10 has an open end 13 through which the pieces of material enter and a conveyor generally indicated at 14 for supporting the material and transporting it into the apparatus. When each succeeding piece of material reaches the desired position along conveyor 14, the piece is discharged from the conveyor for gravitation to the skid 12.

As herein disclosed, the material being handled in magnetic (that is, material capable of being magnetized) and therefore it is preferable that conveyor 14 be of the magnetic type which is capable of supporting an underlying piece of magnetic material. While the invention is hereinafter described as handling flat material in sheet form, it is to be understood that the invention is not limited to handling sheets but may be used in handling material taking other forms such as bars, angles and the like.

In the presently disclosed embodiment, conveyor 14 comprises a plurality of rotatably mounted shafts 15 in spaced, side by side relation. Each shaft 15 (see Figures 2 and 3) carries one or more roll assemblies 16 which, as will later be more fully described, are preferably of the permanent magnet type for low cost and efficiency. Shafts 15 are carried in the upper part of a suitable frame structure 17 having a suitable supporting leg 18 at each corner thereof.

In order to insure that successive sheets will be deposited on skid 12 with their side edges in alignment, side guides 19 are provided. These side guides are preferably adjustable toward and away from each other to accommodate various widths of sheets and are herein shown to be supported by spaced, rotatably mounted shafts 20. These shafts may carry hand wheels 21 whereby they may be rotated, and the shafts may be connected together for unitary rotation by means of a chain trained over sprockets carried by respective shafts. Shafts 20 are provided with external threads while brackets 22, secured to respective side guides 19, are carried by respective shafts and are internally threaded for nut-like engagement with the shafts. It will be understood that as shafts 20 are rotated by hand wheels 21, side guides 19 will move toward or away from each other to provide adjustment of the spacing therebetween for the purpose aforesaid.

The end of side guides 19 adjacent entrance end 13 of the apparatus will preferably be flared outwardly to insure entrance of the sheets and each side guide will be notched out at 23 (see Figure 4) adjacent shafts 15 to clear roll assemblies 16 and to clear other construction later to be disclosed.

In order to reduce the distance through which a sheet falls in gravitating from conveyor 14 to skid 12, the skid is adapted to be supported by a vertically movable platform structure 24. It is an important feature of the present invention that platform 24 is carried by the frame 17 of the apparatus and does not require a pit in the floor as is required by prior art apparatus. This construction reduces manufacturing and installation costs and makes it possible to relocate the apparatus in a short time and at little expense.

Any suitable means may be employed for elevating platform 24 and in the present embodiment, an externally threaded screw 25 is disposed at each corner thereof and each passes through a nut-like member 26 carried by respective platform corners. Each screw 25 is rotatably mounted and each is adapted to be rotated by suitable gearing contained within respective gear boxes 27 carried by respective frame legs 18.

The adjoining gear boxes 27 at respective ends of the apparatus are connected together for unitary operation by means of cross-shafts 28 and the gear boxes at one end are connected with the gear boxes at the opposite end by means of a chain 29 which passes over suitable sprockets and which is adapted to be driven by means of an electric motor 30.

From the foregoing it will be understood that depending upon the direction of rotation of motor 30, all four lift screws 25 will be simultaneously rotated in a direction to either raise or lower the platform in accordance with requirements. Means later to be described are employed to automatically control the height of the platform so as to maintain the spacing between the conveyor 14 and the top sheet of the material stacked upon the skid relatively constant despite the everchanging height of the stack during operation.

As previously mentioned, a sheet is discharged from conveyor 14 when it reaches a predetermined position therealong and in the embodiment thus far disclosed, a stop plate 31 is positioned in the path of the sheet to interrupt its progress at the appropriate place. As best seen in Figure 4, stop plate 31 is secured to a backing plate 32 and a piece of rubber 33 or other dielectric, resilient material is interposed therebetween for a purpose to be disclosed. Backing plate 32 is secured to a supporting structure 34 which is mounted on a transversely extending channel member 35. For a purpose later to be seen, plates 31 and 32 are secured to supporting structure 34 whereby the plates are vertically movable from their full line position wherein plate 31 is in the path of the material supported by the conveyor to the dot-dash line position wherein it is out of the path of the material. In the present embodiment, link means are employed to connect plates 31, 32 to supporting structure 34 and a fluid cylinder 36, connected to a source of fluid pressure by means of a suitable control valve later to be disclosed, is employed to effect the movement aforesaid of plates 31, 32. Structure 34 is secured to channel member 35 by any suitable means which preferably permits positioning the support at various locations transversely of the path of sheet movement so that it may be located most advantageously for the particular sheets being handled. Furthermore, although not shown in the interest of clarity, channel member 35 will preferably be adjustable along the direction of sheet movement to provide for the positionment of stop plate 31 at whatever location along the conveyor which is best suited for the material being handled. Any suitable arrangement may be employed for adjustably mounting channel member 35 for this purpose. By way of illustration, the channel member may form a part of a carriage structure which is shiftable in the direction of sheet movement along suitable guides adjacent respective sides of the frame 17.

In order to break the magnetic attraction between conveyor 14 and a supported sheet when it is desired to release the sheet, the following construction is presently employed. As best shown in Figures 2 and 4, upright arms 37 are pivotally secured at 38 in spaced-apart paired relation with respective arms of each pair adjacent respective sides of the apparatus. The arm pairs are disposed between certain of the conveyor shafts 15 and an inverted T shaped bar 39 is secured to and extends between respective arm pairs to tie such arm pairs rigidly together.

Secured to the underside of each bar 39 by means of screws 40 (see Figure 4) is one or more kickers 41. These kickers have arcuate portions 42 which fit around an adjoining shaft 15 and each is preferably of a non-magnetic material for a purpose to become clear.

Pivotally connecting arms 37 together is a pull rod 43 to whose right hand end is pivotally secured a link 44. A lever 45 is pivotally secured to frame 17 at 46 and the lower end of the lever is pivoted to link 44 while the upper end of the lever is pivotally connected to the piston rod 47 of a fluid cylinder 48. Normally, the aforesaid parts will be maintained in the full line position illustrated as by means of a suitable spring (not shown). However, when fluid is admitted to cylinder 48, the latter will exert a pull on rod 43, thus shifting the parts connected thereto to the dot-dash line position. Note that in this position the arcuate portions 42 of kickers 41 will extend beyond the sheet engaging periphery of magnetic rolls 16; accordingly, when the kickers are simultaneously moved to such position by cylinder 48, they will force a sheet supported by the magnetic conveyor rolls away from the rolls to permit the sheet to gravitate from the conveyor.

Although not shown in detail, at least certain of conveyor shafts 15 will be connected together for unitary rotation by any suitable means such as, for example, by sprocket and chains, such shafts being adapted to be rotated in the same direction by means of a suitable drive motor 49 (see Figure 3).

As best shown in Figure 5, a novel construction is employed to provide magnetic rolls 16. As therein illustrated, each roll preferably is formed by assembling a tubular, permanent magnet member 50 with a pair of pole pieces 51. The pole pieces are made of a magnetizable material, of course, and one disposed at each end of the magnet member, the pole pieces being held assembled with the magnet by suitable rivets 52. Each roll assembly 16 is pressed upon its shaft 15 and held by a suitable key, the shaft being formed of a suitable non-magnetic material so as not to dissipate the magnetic field. Note that in the present embodiment, the diameter of pole pieces 51 is greater than the diameter of magnet member 50 so as to increase the concentration of the magnetic field upon the sheet S shown engaged beneath the roll.

In the embodiment shown in Figure 11, a piece of relatively soft material 53 such as for example, wood or the like is interposed between the pole pieces 51a. The diameter of piece 53 is slightly greater than the diameter of the pole pieces so as to maintain the sheet S out of engagement with the pole piece. The purpose of this modified construction is to insure against scratching or otherwise maring the sheets when sheets of a highly finished nature are being handled.

Operation of the apparatus illustrated in Figures 1 through 4 will be as follows: Assuming that guides 19 have been properly adjusted for the width of the sheet to be handled, that an empty skid 12 is on platform 24, that stop plate 31 has been properly positioned for the length of the sheets to be stacked, and that drive motor 49 is rotating roll shafts 15, the operator will press a start button which will later be described in greater detail. Pressing the start button will cause motor 30 to elevate platform 24 until skid 12 is at a desired elevated position beneath and adjacent conveyor 14 and will also shift stop plate 31 from its dotted line position shown in Figure 4 to its full line position whereby it will be disposed in the path of sheets moving along the conveyor.

As each sheet is successively fed to the apparatus from device 11 or the like, each sheet will be attracted by magnetic rolls 16 and transported to the right as viewed in Figures 1, 2 and 4. When the leading edge of a sheet strikes stop plate 31, the sheet's forward movement will be arrested and an electrical circuit will be completed which will trigger cylinder 48 and cause kickers 41 to momentarily move to their dot-dash line positions to force the sheet downwardly away from the magnetic rolls. The sheet will thereupon gravitate to position upon skid 12. Successive sheets will be piled one on top of the other to form a stack upon the skid and since each sheet is released at the same place and constrained by side guides 19 and stop plate 31, all of the sheets will be in vertical alignment on the skid.

As the stack of sheets on skid 12 increases in height as successive sheets are piled thereon, platform 24 will gradually be lowered to maintain the distance through which each sheet falls relatively constant. As the stack approaches its desired height, the operator will be given a suitable audible and/or visible warning of this condition so that he can prepare to cut off the flow of sheets to the apparatus until it is again ready to receive them. If desired, the aforesaid warning may be given by an electrical impulse to the device feeding the apparatus so that the flow of sheets will automatically be cut. In any event, when the stock is the requisite height, the platform will be lowered to its lowermost position, the loaded skid 12 will be removed (preferably from one side or the other of the apparatus) and an empty skid placed upon the platform for a repetition of the foregoing operations.

It is an important feature that when platform 24 is in its lowermost position, a loaded skid may be removed from either side of the apparatus with no interference from side guides 19. This attends because the side guides extend but a short distance down so as to provide adequate clearance between the top of the stack and the lower margin of the side guides when the platform is at its lowermost position.

Figure 7 diagrammatically illustrates certain devices which are employed at the present time to effect the desired operation of the apparatus. As therein shown, a lower limit switch 54 is mounted whereby its actuator will be engaged with platform 24 when the latter is in its lowermost position and an upper limit switch 55 is mounted whereby its actuator will be engaged with platform 24 when the latter is in its uppermost position. A pair of limit switches 56 and 57 are so positioned that their actuators will be engaged by platform 24 so as to trip their contacts during downward movement of the platform. Note that switch 56 is positioned above switch 57 so that during downward movement of the platform, the former will be tripped prior to the latter.

As previously mentioned, means are employed to maintain the spacing between the top of the stack of sheets on skid 12 and the conveyor 14 relatively constant despite the changing height of the stack. For this purpose, a sensing device 58 is positioned whereby it can ascertain the position of the top of the stack. Various type of commercially available devices may be employed for this purpose; however, it is preferable to at the present time to employ a device of the type which utilizes the principal of magnetic detection.

Briefly, current is passed through device 58 to set up a magnetic field. When there is no magnetic material in this field, only a small amount of current will be passed by the device; however, when there is magnetic material in the field, a considerably larger amount of current is passed. As will later be disclosed, the foregoing principle is employed to automatically move platform 24 down as the stack of sheets piled thereon increases in height.

Referring to the schematic electrical diagram shown in Figure 8, it will be seen that a plurality of solenoid relays A, B, C, D, E, F and G are employed. Relay A has normally open contacts A–1 and normally closed contacts A–2; relay B has normally open contacts B–1 and normally closed contacts B–2; relay C has normally open contacts C–1, C–2, C–3, C–4 and C–5; relay D has normally open contacts D–1 and D–2; relay E has normally open contacts E–1; relay F has normally open contacts F–1 and F–2 and normally closed contacts F–3; and relay G has normally open contacts G–1 and G–2.

Lower limit switch 54 has normally closed contacts 54x and 54y; however, since platform 24 is at this time at its lowermost position, contacts 54x and 54y are being held open by engagement of the platform with the actuator of this switch. Upper limit switch 55 has normally closed contacts 55x and normally open contacts 55y. Limit switches 56 and 57 have respective normally open contacts 56x and 57x.

Motor 30 is connected to power line L–1 by means of a circuit 59 and to power line L–2 by means of circuits 60, 61. When current flows through motor 30 via circuits 59, 60, the motor will be rotated in a direction to elevate platform 24. When current flows through the motor via circuits 59, 61, it will be rotated in a direction to move platform 24 down.

Interposed in circuit 60 are normally closed contacts 55x of the up limit switch 55 and contacts A–1 and B–2 of respective relays A and B. A circuit 71 shunts around contacts A–1 and interposed in such circuit are contacts C–2 and D–3 of respective relays C and D. Interposed in circuit 61 are contacts 54x of the down limit switch 54 and contacts A–2 of relay A. Circuit 61 is connected to line L–2 via circuits 62, 63 and 64 in which are respectively interposed contacts F–2 of relay F; contacts B–1 of relay B and contacts E–1 of relay E.

Extending across lines L–1 and L–2 is a circuit 65 in which is interposed a suitable visual and/or audible warning device 66 and contacts 56x of limit switch 56. A circuit 67 extends across the power lines and has interposed therein contacts 57x of limit switch 57, the solenoid of relay F and contacts C–4 of relay C. A circuit 68 shunts around contacts 57x and contains contacts F–1 of relay F.

Means are provided for controlling current flow in the previously mentioned up power circuit 60 and such means comprises an up control circuit 69 bridging power lines L–1 and L–2 in which is interposed the solenoid of relay A and an up push button 70 having normally open contacts 70x.

A down control circuit 72 is provided for controlling current flow in the previously mentioned down power circuit 61 and circuit 72 extends across lines L–1 and L–2 and interposed therein is the solenoid of relay B and normally open contacts 73x of a down push button 73.

There is further provided an automatic control circuit 74 which extends across lines L–1 and L–2 and which controls flow of current in power circuits 60 and 61. Circuit 74 includes the solenoid of relay C, normally open contacts 75x of a start push button 75, and the normally closed contacts 76x of a stop push button 76. A circuit 77 shunts around contacts 75x and included in this circuit are contacts C–1 and G–1 of respective relays C and G.

The means provided for tripping kickers 41 so as to release a sheet from the conveyor 14 comprises a release circuit 78 across lines L–1 and L–2 which includes the frame 17 of the apparatus, insulated stop plate 31 and the solenoid of a solenoid operated fluid valve 79 which is connected to fluid cylinder 48 for effecting operation of the latter.

The previously mentioned sensing device 58 is disposed in a circuit 80 which extends across lines L–1 and L–2 and includes the solenoid of relay E and contacts D–2 of relay D.

The means for controlling operation of fluid cylinder 36, which cylinder controls the position of stop plate 31, comprises a circuit 81 which extends across lines L-1 and L-2 and includes contacts F-4 and C-5 of respective relays F and C and the solenoid of a solenoid operated fluid valve 82 which is connected to cylinder 36.

Referring once again to upper limit switch 55, the normally open contacts 55y thereof are interposed in a circuit 83 which extends across lines L-1 and L-2 and which includes the solenoid of relay D and contacts C-3 of relay C. A circuit 84 shunts around contacts 55y and included in this circuit are contacts G-2 of relay G and contacts D-1 of relay D. A circuit 85 extends across lines L-1 and L-2 and interposed in this circuit are contacts 54y of lower switch 54 and the solenoid of relay G.

With platform 24 in the lowermost position illustrated in Figures 1, 2 and 3, operation will be as follows: Note that with the platform in this position, the normally closed contacts 54x of lower limit switch 54 are held in the open position shown so as to break the down power circuit 61. Note also that all of the circuits across lines L-1 and L-2 are open so that no current flows.

Assuming that the operator desires to merely elevate platform 24, he will press and hold the up push button 70. This will cause current to flow in circuit 69 to energize relay A and thus open relay contacts A-2 in the down power circuit 61 and close relay contacts A-1 in the up power circuit 60. Nothing will occur at this time when contacts A-2 open since no current was flowing in circuit 61; however, with the closing of contacts A-1, current will flow to motor 30 via the up power circuit 60 and the motor will thereupon be rotated in a direction to so rotate lifting screws 25 that the platform will be elevated. Platform 24 will move upwardly until such time as the up button 70 is released or until the platform reaches its uppermost position whereupon motor 30 will automatically be deenergized by the opening of contacts 55x of the up limit switch 55.

If the platform 24 is above its lowermost position, operator may move it down by pressing and holding the down push button 73. This will cause current to flow in down control circuit 72 to energize relay B. Energization of relay B will open normally closed contacts B-2 in the up power circuit 60 to insure that this circuit is open and will close the normally open contacts B-1 in the down power circuit 61. The closing of contacts B-1 will feed current to motor 30 via the down power circuit 61 since contacts 54x of down limit switch 54 are closed because the platform is above its lowermost position. Motor 30 will rotate in a direction to move platform 24 down until the operator either releases the down button 73 or until the platform reaches its lowermost position whereupon the down power circuit 61 will be automatically broken by the opening of contacts 54x of lower limit switch 54.

When the operator desired to commence stacking operations, he will press the start push button 75. This will energize relay C and close contacts C-1 in circuit 77, contacts C-2 in circuit 71, contacts C-3 in circuit 83, contacts C-4 in circuit 67, and contacts C-5 in circuit 81. The closing of contacts C-5 will energize solenoid valve 82 to cause fluid to flow to cylinder 36 and thus shift stop plate 31 to its full line position shown in Figure 4 wherein it is disposed in the path of sheets transported by the conveyor 14. The closing of contacts C-2 will energize motor 30 via the up power circuit 60 and shunt circuit 71. The platform will therefore move upwardly.

As soon as upward movement of the platform has caused contacts 54x and 54y of the down limit switch 54 to close, the operator may release the start button since with the closing of contacts 54y, relay G in circuit 85 is energized to close contacts G-2 in shunt circuit 84 and contacts G-1 in shunt circuit 77. Closing the last mentioned contacts maintains current flow through relay C as will be apparent. The upward movement of the platform will continue without further attention by the operator until the platform reaches its uppermost position and engages the actuator of upper limit switch 55 to open its contacts 55x and close its contacts 55y. The opening of contacts 55x breaks the up power circuit 60 to deenergize motor 30 and the closing of contacts 55y energizes relay D in circuit 83.

Energization of relay D closes contacts D-1 in shunt circuit 84 and closes contacts D-2 in circuit 80. The apparatus is now prepared to receive and stack sheets as they are fed thereto.

Assuming that motor 49 is rotating shafts 15, sheets may be fed in succession to the apparatus as before described. As each sheet enters end 13 of the apparatus, the sheet will be attracted by magnetic rolls 16 and supported thereby. Since the rolls are rotating, the sheet will be fed to the right (in the relation of parts shown in Figures 1, 2 and 4) toward stop plate 31 which, it will be recalled, is disposed in the full line position shown in Figure 4.

When the leading edge of the sheet strikes stop plate 31, release circuit 78 will be momentarily completed between the conveyor rolls and the stop plate through the sheet which is in electrical engagement therewith. Completion of this circuit energizes solenoid valve 79 and causes cylinder 48 to momentarily shift kickers 41 from the full line position shown in Figure 4 to the dot-dash line position. This movement of the kickers will force the sheet away from the magnetic rolls and allow it to gravitate to the underlying skid supported by the platform. As each sheet moves into the apparatus, each will in turn be released so that the sheets accumulate in a stack upon the skid.

When the stack of sheets build up sufficiently high to enter the magnetic field of sensing device 58, the latter will pass sufficient current through circuit 80 to energize relay E. It will be recalled that contacts D-2 are closed at this time because relay D is energized. When relay E is energized, it will close contacts E-1 in circuit 64 and energize motor 30 via the down power circuit 61. Energization of motor 30 through this circuit will move platform 24 down. It will be noted that even though contacts 55y open once again as the platform moves down from its uppermost position, relay D will remain energized through shunt circuit 84. Downward movement of the platform will continue until the stack of sheets has moved out of the magnetic field of sensing device 58 whereupon relay E will be de-energized to open the down power circuit 61. Sheets will continue to be deposited on the stack and the platform will continue to move down as the stack increases in height until a stack of the requisite size has been formed.

As the stack of sheets continues to increase in height and as the platform moves down to maintain the spacing between the conveyor and the top of the stack relatively constant, the platform will reach a position which corresponds to the desired height of the stack. Immediately prior to reaching such position, the platform will trip limit switch 56 and close its contacts 56x. This will energize warning device 66 in circuit 65 to signal the operator that the stack is nearly completed.

When the platform reaches a position corresponding to the desired height of the stack, the platform will trip the actuator of limit switch 57 and close its contacts 57x. This will energize relay F in circuit 67 and close relay contacts F-1 in shunt circuit 68, contacts F-2 in circuit 62 and open contacts F-3 in circuit 81.

The closing of contacts F-1 will bypass switch contacts 57x so as to maintain relay F energized after the platform has passed the switch and allowed contacts 57x to reopen. The closing of contacts F-2 will energize motor 30 via the down power circuit 61 and circuit 62 and the platform will continue to move down uninterruptedly until it reaches its lowermost position. The opening of contact F-3 in circuit 81 will de-energize solenoid valve 82 and thus return stop plate 31 to its dot-dash line position.

When the platform reaches its lowermost position, it will open contacts 54x and 54y of lower limit switch 54. The opening of contacts 54x will open the down power circuit 61 to de-energize motor 30 and the opening of contacts 54y will de-energize relay G whereupon its contacts G–1 in shunt circuit 77 and contacts G–2 in shunt circuit 84 will open. With the opening of contacts G–2, relay D will be de-energized and with the opening of contact G–1 relay C will be de-energized. The various circuit components will then be in the respective positions shown in Figure 8 wherein all of the circuits are open.

When the platform 24 has returned to its lowermost position as above described, the loaded skid 12 will be removed and an empty skid disposed in its place upon the platform. Stacking operation may then be resumed, as before described, by pressing the start button 75. As will be apparent from the circuit diagram, operation of the apparatus may be interrupted at anytime by momentarily depressing the stop button 76.

As previously mentioned, the present invention is adapted to not only stack sheets fed thereto but may also be employed to feed stacked sheets to other apparatus. Only slight changes need be made to effect this change-over of operations and as best shown in Figure 9, the only change necessary is to replace kickers 41 with similarly shaped members 86 each having a suction cup 87 secured to their free ends. In the present embodiment, the suction cup is attached to member 86 by a ball and socket connection 88 to permit the cup to align itself with the plane of the sheet being fed despite the fact that member 86 assumes positions of various angular relationship with the sheet.

It is preferable at the present time to provide each suction cup 87 with a valve 89 which is resiliently urged toward its seat by means of a spring 90. Valve 89 has an upstanding stem 91 which engages with a release rod 92 secured to and depending from the top of frame structure 17 to shift the valve away from its seat when the parts are in the full line position shown in Figure 9.

In operation, a stack of sheets will be elevated by platform 24 until the top of the stack is close beneath the rotating conveyor rolls 16. Cylinder 48 will then be actuated to shift the various parts to their dot-dash line positions to force the suction cups against the top sheet of the stack. Since valve 89 closes as soon as stem 91 moves away from the lower end of release rod 92, the suction cups will tightly grip the uppermost sheet of the stack.

Cylinder 48 will then be actuated to return the parts to their full line position to thus raise the uppermost sheet to engagement with rolls 16. As the sheet engages and is gripped by the magnetic rolls 16, valve stems 91 will engage release rods 92 to break the vacuum holding the sheet to the suction cups. The sheet, now supported by the magnetic attraction of rolls 16 will be fed by the rotating rolls in the direction of the arrow and discharged to whatever apparatus is adapted to receive it. Although not shown, it will be understood that a control circuit similar to that illustrated in Figure 8 may be employed to render the feeding operation automatic. The control circuit for feeding operations would differ from that heretofore shown for stacking, primarily in that the platform would be automatically raised as the stack diminishes in height instead of the reverse as was described.

When the invention, as thus far disclosed is used for stacking, it is necessary to cease feeding sheets thereto during the time interval while a loaded skid is removed from the platform and is replaced by an empty one. Under certain circumstances, it is desirable that there be no interruption in the flow of sheets to the machine 10. If such be the situation, two identical machines 10a, similar in all respects to machine 10, may be disposed in end to end abutting relation as illustrated in Figure 10.

Each of these machines will operate individually in the same manner as heretofore disclosed. However, assuming that sheets are being stacked by the machine on the left and that an empty skid is on the platform of the machine on the right and that such platform is elevated to its sheet receiving position, as the last sheet falls in the stack on the left, an electrical signal will be sent to the machine on the right and the next sheet and the ones succeeding it will pass uninterruptedly through the machine on the left and to the machine on the right to be stacked by the latter.

During the interval that the machine on the right is stacking sheets, the loaded skid on the left may be removed and replaced by an empty one and the platform then elevated so as to ready this machine for stacking upon a signal that the machine on the right has completed its stack. With this novel arrangement, the flow of sheets to be stacked may continue uninterruptedly.

Means for providing the aforementioned electrical signal may easily be incorporated in the electrical control circuit shown in Figure 8 by providing a shunt circuit 93 about the start button 75. Interposed in circuit 93 will be normally open contacts 94. Assuming that the circuit shown is for the machine on the left and that an identical circuit is employed by the machine on the right, contacts 94 will be closed upon energization of relay F of the machine on the right. In the control circuit for the machine on the right, contacts 94, of course, would be closed upon energization of relay F of the machine on the left.

While the use of two separate machines have been shown in end to end relation, it will be understood that a single piece of apparatus, embodying the same novel method of operation, could as well be employed. Furthermore, it is to be understood that two machines may be set up for feeding operations in the same manner as disclosed for stacking operations. The advantage in this case, of course, being in the uninterrupted feeding of sheets instead of in the uninterrupted receiving of sheets.

In the event it is desired to reduce the time interval during which flow of sheets is interrupted and yet it is not desired to employ the invention disclosed in Figure 10, an arrangement as shown in Figure 11 may be employed. In this embodiment, one machine 10b is employed which may be similar in all respects to machine 10. However, there is additionally provided a carriage which is divided into two sections, 95 and 96. Either of the sections 95, 96 may be positioned on platform 24b of the machine and when one is so positioned, the other is at one side of the machine.

Any suitable means 97 may be employed to effect horizontal movement of carriage sections 95, 96 and a suitable slip joint connection 98 (see Figure 12) will be provided between the respective secitons and between section 95 and means 97 to secure the sections and means 97 together for unitary horizontal movement but which permits either one of the sections to be elevated by platform 24b without affecting the other section.

With the parts positioned as shown in Figure 11 and with a skid 12b on respective sections 95, 96, operation will be as follows: Patform 24b will be elevated, as before described with respect to Figures 1 through 4, and sheets fed to the machine and stacked upon the elevated skid. When this skid is loaded and platform 24b has returned to its lowermost position, section 95 will be shifted to the right by means 97 to place this section upon the platform and the latter will then be elevated to permit further stacking operations. The shifting of section 95 to the right will also cause section 96 to move to the right to its dot-dash line position whereupon the loaded skid thereon may be removed and replaced by an empty skid while the skid on section 95 is being loaded. When the skid carried by section 95 has been loaded and the platform returned to its lower-most position, means 97 will draw the sections to the left to return them to the position shown whereupon sheets may be stacked upon the skid carried by section 96 and whereupon the loaded skid on section 95 may be removed and replaced by an empty one.

Obviously, considerable down time is saved in this embodiment since stacking operations need be interrupted only during the short interval while sections 95, 96 are shifted by means 97 and while the platform is being elevated. The line need not be shut down while the loaded skid is removed by a lift truck or the like since such operation may be done at leisure during loading of the other skid. It will readily be understood that the embodiment disclosed in Figure 11 may be employed with equal facility regardless of whether the machine is employed for receiving and stacking sheets as described or for feeding sheets.

The embodiment shown in Figure 13 is similar to the embodiment disclosed in Figures 1 through 4 with the exception that the shiftably mounted stop plate 31 is omitted and its place is taken by a fixedly mounted stop plate 99. As illustrated, stop plate 99 is positioned below the path of the sheet as it is transported by conveyor 14c. This embodiment employs a limit switch 100 having a depending actuator arm 101 disposed in the path of the sheet as it is transported by the conveyor.

In operation, a sheet will be carried beneath the conveyor from left to right as before described until its leading end engages and moves actuator arm 101. This will trip limit switch 100 which will complete a release circuit similar to circuit 78. With the completion of the release circuit, the sheet will be forced downwardly away from the conveyor by kickers 41c. The sheet will be kicked a sufficient distance downwardly prior to its reaching stop plate 99 so that the sheet will strike the stop plate whereupon its forward movement will be arrested and it will fall straight down until it comes to rest upon the underlying sheets previously stacked.

In the event it is desired to employ the machine illustrated in Figure 13 in tandem as shown in Figure 10, it is only necessary to deactivate the release circuit in which limit switch 100 is interposed in order to permit a sheet to pass through the first machine and to the second machine for stacking by the latter.

In view of the foregoing it will be apparent to those skilled in the art that we have accomplished at least the principal object of our invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that our invention is not limited thereto.

We claim:
1. Apparatus for handling sheets of moving magnetic material, comprising a plurality of magnetic rolls spaced longitudinally of the direction of sheet movement and each rotatable about respective generally horizontal axes extending transversely of the sheet movement to support longitudinally spaced portions of an underlying sheet of material, a pair of generally upright link members spaced longitudinally of the direction of sheet movement, said link members being disposed between respective roll axes and each having a portion engageable with an underlying roll-supported sheet, means providing a pivot axis for each link member which extends generally parallel with adjoining roll axes, a second link member extending between and pivotally connecting said first mentioned link members together for unitary pivotal movement about respective pivot axes, and means for effecting longitudinal movement of said second link member to effect pivotal movement of said first mentioned link members from a first position wherein their said portions are disposed above the lower, sheet-engaging faces of said rolls to a second position disposed beneath such sheet-engaging roll faces.

2. The construction of claim 1 wherein each roll is carried by a respective shaft, wherein respective first mentioned link member portions extend transversely of respective link members in the direction of sheet movement and underlie an adjoining roll shaft, and wherein each portion has an upwardly facing arcuate part partially encircling a respective roll shaft.

References Cited in the file of this patent

UNITED STATES PATENTS

| | | |
|---|---|---|
| 1,384,177 | Bethke | July 12, 1921 |
| 1,565,840 | Wise | Dec. 15, 1925 |
| 2,008,200 | Clauss | July 16, 1935 |
| 2,193,162 | Carter | Mar. 12, 1940 |
| 2,312,357 | Odquist et al. | Mar. 2, 1943 |
| 2,323,174 | Wikle | June 29, 1943 |
| 2,492,889 | Royal | Dec. 27, 1949 |
| 2,588,085 | Clouse | Mar. 4, 1952 |
| 2,623,628 | Jones | Dec. 30, 1952 |
| 2,655,223 | Villars | Oct. 13, 1953 |
| 2,657,049 | Baker | Oct. 27, 1953 |
| 2,661,948 | Montgomery | Dec. 8, 1953 |
| 2,698,693 | Nordquist | Jan. 14, 1955 |
| 2,812,846 | Nordquist | Nov. 12, 1957 |
| 2,818,954 | Vice | Jan. 7, 1958 |